July 22, 1958 A. I. NELSON 2,844,474
PACKAGING AND PROCESSING OF POULTRY
Filed April 29, 1957
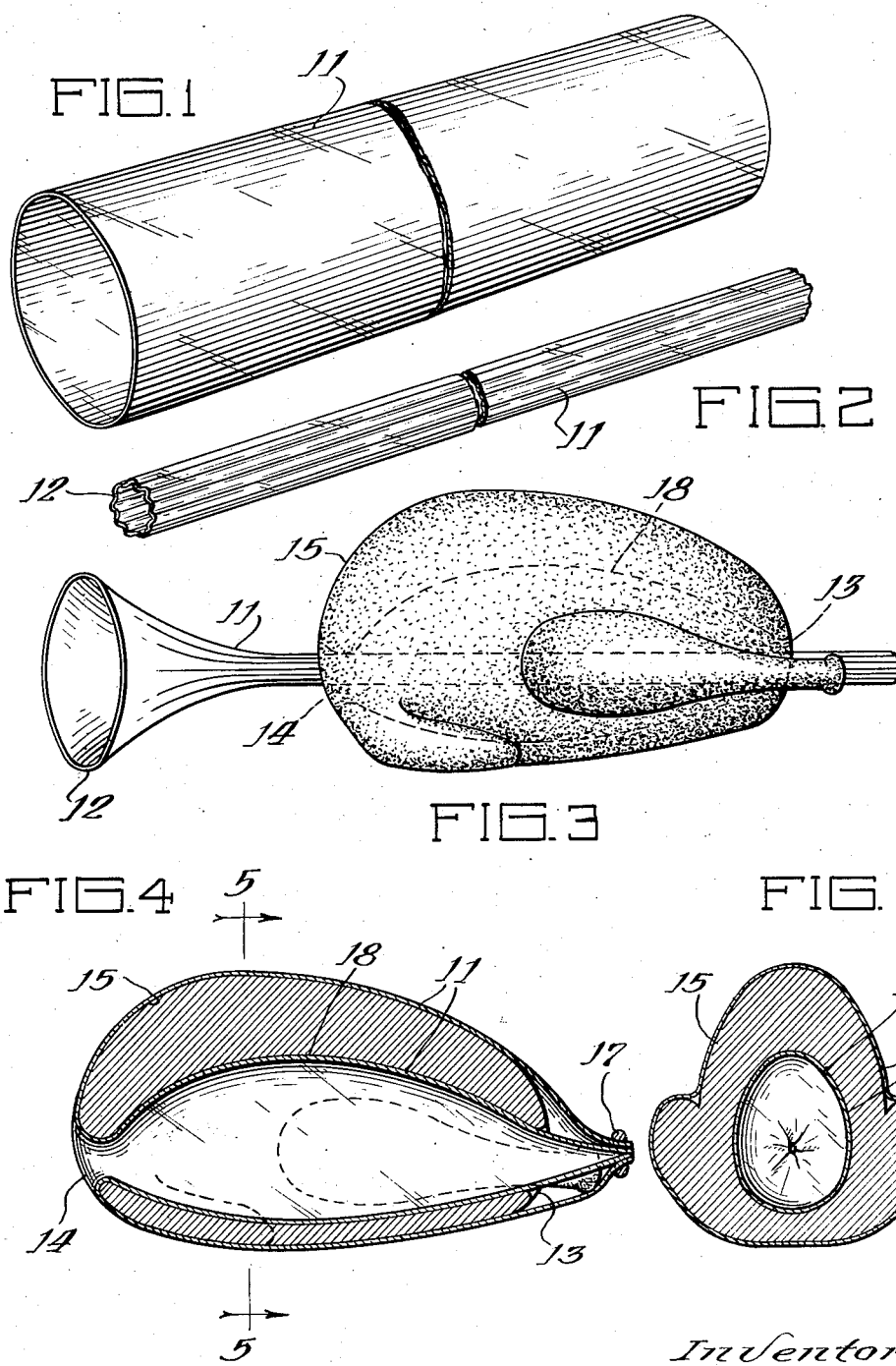
Inventor:
Alvin I. Nelson
By: Ernest V. Haines
Attorney United States Patent Office 2,844,474
Patented July 22, 1958

2,844,474

PACKAGING AND PROCESSING OF POULTRY

Alvin I. Nelson, Champaign, Ill., assignor to International Minerals and Chemical Corporation, Chicago, Ill., a corporation of New York Application April 29, 1957, Serial No. 655,806

7 Claims. (Cl. 99—174)

The present invention relates to the preparation and preservation of poultry. More particularly, it relates to an improved method and means for precooking and packaging eviscerated poultry.

Within recent years, the practice of preserving food products in the frozen state has become widespread, and many products have been subjected to a precooking operation prior to storage, so that they can quickly be served merely by thawing and heating. Such precooking and/or storage of eviscerated poultry has been attempted, but the procedures employed have left much to be desired. For instance, in one technique, the carcass was sealed in a plastic bag and cooked therein. This left an objectionable amount of air in the abdominal cavity, which tended to cause rancidification and desiccation of the abdominal tissues. Moreover, such a package tended to rupture during the cooking process, owing to the expansion of the trapped air. Finally, the cooked bird tended to dry out and become unappetizing during storage. I have now devised a method and means by which these difficulties are avoided.

An object of the present invention is to provide an improved package for eviscerated poultry.

Another object is to prepare eviscerated poultry in a hermetically sealed package from which air is effectively excluded.

Another object is to prepare eviscerated poultry in a precooked form, enclosed in a water-tight, air-tight package, substantially completely free from air, and suitable for indefinitely prolonged storage in the frozen condition.

A further object is to subject eviscerated poultry to precooking in the substantially complete absence of air and in indirect contact with the cooking medium.

A further object is to prepare eviscerated poultry in a precooked and packaged form, suitable for storage in the frozen state, and for consumption after being thawed and heated.

In one aspect, my invention is an "inside-outside" wrapped package for eviscerated poultry. Such a package can be prepared and applied according to the following procedure, to be read in conjunction with the attached drawing. The wrapping material is a flexible plastic tube 11 (Figure 1) of a diameter slightly larger than the carcass to be packaged. The tube is squeezed, rolled, or otherwise reduced to relatively small diameter (Figure 2), and one end 12 is inserted at the posterior opening (13, Figure 3) of the abdominal wall of the cascass, passed through the interior, and withdrawn through the neck opening 14. The emerging end 12 of the tube is opened, turned inside out, and slipped over the exterior surface 15 of the bird. The tube 16 protruding from the posterior opening is flattened against one side of the interior of the end 12 of the tube covering the exterior surface, and the end 12 is attached to a vacuum source to remove air from the enclosed carcass. The tubes are then twisted together while still attached to the vacuum source, and the twisted portion is sealed off with a clip (17, Figure 4, this figure being a lengthwise cross-section of the packaged carcass). This results in a complete covering of both the inside (18) and outside (15) surfaces of the eviscerated bird with a skin-tight film, by which air is excluded therefrom, while the moisture content of the bird is preserved. The completed package is further illustrated by Figure 5, which represents a transverse cross-section at line 5—5 in Figure 4.

In another aspect, my invention is a method for precooking eviscerated poultry and preparing it in a form ready for frozen storage, employing an "inside-outside" wrap as described above. In this aspect, poultry, after being eviscerated, cleaned, and dressed, is wrapped inside and out with an impervious plastic film and sealed therein, and is precooked by heating in a water bath until suitable for human consumption. Such cooking can be carried out in a tank of water maintained at a temperature between about 150 and about 175° F. for a period of about two to about five hours or more, the cooking time varying directly with the size of the bird and inversely with the temperature. An eight-pound turkey, for example, can be cooked satisfactorily in about four hours in a bath maintained at 160° F. The carcass is rapidly brought up to temperature by this method, and there is no tendency for the plastic bag to balloon or rupture because of release or expansion of gases. When the precooking has been completed, the wrapped carcass is immediately and rapidly cooled by immersing in water maintained at a temperature between about 32 and about 40° F. The cooled bird, still in its package, is then ready for quick freezing and for storage in the frozen condition. Such storage can be continued indefinitely, since the bird is kept out of contact with air, and the loss of moisture and juices therefrom is prevented. The product is conveniently prepared for consumption merely by thawing, removing the wrapper, heating and browning by any suitable means, and serving.

In an advantageous cooking technique, an inside-outside wrapped carcass is immersed in a water bath provided with pipes or tubes, one of which projects into the abdominal cavity of each carcass, without penetrating the sealed interior of the wrapper. Hot water having the desired temperature is introduced through such a conduit into the less-accessible inner portion of the carcass, and emerges therefrom either around the entry pipe or from the opposite end of the carcass, depending upon whether the opening at the opposite end is sealed by the wrapper or not. The entire surface of the carcass is uniformly heated in this way, while contact of the hot water with the carcass itself is, of course, prevented by the inside-outside wrap.

The wrapping material employed in my invention should be substantially impervious to air, water, and water vapor, and should be shrinkable or flexible enough to give a skin-tight fit to the inside and outside of the bird. It should also be readily sealable by convenient means, for instance by application of heat, by twisting and clipping, by twisting and binding with wire or rubber bands, or by other means described in the art. As far as possible, it should retain its flexibility under the conditions ordinarily employed for freezing storage, and should ideally be tough enough to withstand the abrasions normally encountered in the handling of frozen foods. If the bird is to be precooked in the wrapper, then the wrapping material must withstand the elevated temperatures employed in such treatment. Finally, the wrapping material should desirably be transparent in order to display the packaged bird to the best advantage. A variety of plastic materials are known to the art which satisfy the foregoing requirements. The polymers and copolymers of vinylidene chloride are an example, including Saran, Cryovac, and the like. Shrinkable polyester films made from condensation products of ethylene glycol and terephthalic acid can advantageously be used, e. g. shrinkable Mylar. Rubber hydrochloride films such as Pliofilm can also be employed. Other suitable materials can readily be ascertained from the art.

The precise technique employed in applying my inside-outside wrap may be modified in a variety of ways. It is convenient, for instance, to insert a rigid rod or tube into the plastic tube to assist in passing it through the abdominal cavity of the bird, after which the rigid member is withdrawn. The plastic tube can be inserted initially into either end of the carcass, and either end of the tube can be expanded and folded backward to envelop the external surface of the carcass. In completing the package, the annular space between the two tubes can be connected to a vacuum source and the ends of the two tubes can be twisted together and clamped. Alternatively, after such evacuation of the annular space, the outer tube can be sealed concentrically to the inner tube, and the excess material beyond the seal can be cut off, so that an open passage exists completely through the interior of the carcass. It is further possible to seal the end of the tube protruding from the inside of the carcass, then to attach the tube covering the external surface to a vacuum source, and finally to tie off the latter tube. Other modifications of the manipulative techniques will be readily apparent.

In the packaging of poultry according to my invention, it is highly advantageous to pretreat the uncooked flesh of the fowl by injecting therein at a plurality of places an aqueous solution containing around 2 to 10% of monosodium glutamate or other edible glutamic acid salt, the solution being added to the extent of between about 3 and about 8% of the dressed weight of the bird, and thereafter to age the treated poultry, preferably after wrapping as in my invention, at a temperature between about 32 and about 50° F. for at least about 12 hours prior to cooking. Such injection is described in detail and claimed in Buchanan U. S. Patent 2,709,658 (May 31, 1955), and is frequently referred to in the art as "stitching" or "stitch pumping." The Buchanan treatment has the advantage of improving the flavor and succulence of the poultry flesh.

In employing the Buchanan technique, it is advantageous to follow the improved practice of Ellis, described in detail and claimed in U. S. Patent 2,687,961 (August 31, 1954), wherein the aqueous glutamate solution also includes from about 0.75 to about 3% by weight of a gelling agent such as gelatin, agar-agar, Irish moss, or the like. The presence of the gelling agent insures that the glutamate solution will remain within the flesh, will not bleed or run from the tissue, and will not appear as unsightly pockets of solution under the skin of the fowl.

In the Buchanan and Ellis techniques, the glutamate solution is injected into the flesh of the fowl in a multiplicity of areas. For instance, an injection is made in each thigh, in each leg, in each side of the breast, in each wing, and in the back. The injections are preferably made with a needle having perforations in its sides as well as in its point, so that the liquid enters the flesh in a plurality of directions. The total quantity of injected solution should ordinarily range between about 4 and about 5% of the original weight of the fowl.

My invention is broadly applicable to the packaging and treatment of eviscerated poultry, including broilers, fryers, stewing chickens, ducks, geese, turkeys game birds, and the like.

The following specific examples will more fully illustrate my invention.

*Example 1*

Three eviscerated turkeys, weighing from 6.5 to 8 pounds each, were stitch injected with about 5% by weight of an aqueous solution containing 5% gelatin and 2.5% monosodium glutamate. Thermocouples were inserted deep into the breasts of the turkeys. Each turkey was then inside-outside wrapped in accordance with my invention by thrusting a Cryovac tube entirely through the abdominal cavity, folding the emergent end backward around the exterior of the turkey, evacuating the enclosed space to a vacuum of 23.5 to 24.5 inches of mercury, twisting and sealing. The turkeys were cooked in a water bath at 160° F. The temperature of the flesh rose rapidly above 140° F. and gradually approached 160° F. A 4-hour total heating time was found to effect adequate precooking. Inspection of one of the pre-cooked turkeys revealed that most of the injected solution had been retained in the tissues. Another turkey was unwrapped, roasted in an oven for one hour at 375° F., and found to be of excellent appearance and flavor.

*Example 2*

An eviscerated chicken weighing 2 pounds, 5.5 ounces was inside-outside wrapped in Cryovac film, evacuated, sealed, and immersed in a water bath. The water was slowly heated to 160° F. over a period of one hour, then maintained at 160° F. for 2 hours, at the end of which time the chicken was removed from the bath. It was observed that the inside-outside package did not expand or swell during the cooking, and the bird was well done in all parts.

For comparison, four other chickens of approximately the same weight were packaged in an ordinary Cryovac bag, evacuated, sealed, and cooked as described above. Two of the bags burst during the heating period.

While I have described my invention with reference to certain specific packaging materials, techniques, and conditions, it is to be understood that such details are illustrative only and not by way of limitation. Numerous modifications and equivalents of the invention will be apparent from the foregoing description to those skilled in the art.

In accordance with the foregoing description, I claim as my invention:

1. An eviscerated fowl, hermetically sealed and cooked in an evacuated, skin-tight, impervious plastic film, said film extending in tubular form completely through the abdominal cavity of said fowl and covering the interior and exterior surfaces thereof.

2. A method for packaging eviscerated poultry which comprises introducing a tube of flexible plastic film through the abdominal cavity thereof, unfolding one protruding end of said tube, slipping it inside out and backward over the exterior surface of the fowl to cover said exterior surface, and evacuating and sealing said fowl within the resulting wrapper.

3. A method for packaging eviscerated poultry which comprises introducing a tube of flexible plastic film through the abdominal cavity thereof, flaring one protruding end of said tube and slipping it, inside out and backward, over the external surface of the fowl, whereby said fowl is enveloped inside and out by said tube, and evacuating and sealing said fowl within the resulting wrapper of annular cross-section.

4. A method for packaging eviscerated poultry which comprises introducing a tube of flexible plastic film through the abdominal cavity thereof, sealing one protruding end of said tube, turning the other protruding end inside out and slipping it backward over the external surface of the fowl, whereby said fowl is enveloped therein, and evacuating and sealing said fowl within the resulting wrapper.

5. A method for packaging eviscerated poultry which comprises introducing a tube of flexible plastic film through the abdominal cavity thereof, flaring one protruding end of said tube and slipping it, inside out and backward, over the external surface of the fowl and over the protruding end, whereby said fowl is enveloped inside and out by said tube, evacuating said fowl within the resulting wrapper of annular cross-section, and twisting and clamping the ends of said tube to seal the fowl therein.

6. A method for precooking eviscerated fowl which comprises introducing a tube of flexible, heat-resisting plastic through the abdominal cavity thereof, unfolding one protruding end of said tube, slipping it inside out and backward over the external surface of the fowl to envelop the fowl therein, evacuating and sealing said fowl in the resulting wrapper of annular cross-section, and cooking the packaged fowl in a water bath at a temperature between about 150 and about 175° F.

7. A method for precooking eviscerated fowl which comprises introducing a tube of flexible, heat-resisting plastic through the abdominal cavity thereof, unfolding one protruding end of said tube and slipping it inside out and backward over the external surface of the fowl to envelop the fowl therein, evacuating and sealing said fowl in the resulting wrapper of annular cross-section, immersing the packaged fowl in a heated water bath, introducing a stream of hot water into the abdominal cavity of the fowl without penetrating the sealed interior of the wrapper, and maintaining the water temperature within the range of about 150 to 175° F. for a time sufficient to complete the cooking of the fowl.

References Cited in the file of this patent

UNITED STATES PATENTS

| | | |
|---|---|---|
| 2,230,067 | Pedlow | Jan. 28, 1941 |
| 2,586,078 | O'Malley | Feb. 19, 1952 |
| 2,779,681 | Sell et al. | Jan. 29, 1957 |

OTHER REFERENCES

"Refrigeration Engineering," February 1954, page 46, article entitled, Packaging and Wrapping Materials.